(12) United States Patent
Berndt et al.

(10) Patent No.: US 7,630,294 B2
(45) Date of Patent: Dec. 8, 2009

(54) METHOD AND COMMUNICATION ARRANGEMENT FOR ALTERNATELY OPERATING A TERMINAL AT AT LEAST TWO COMMUNICATION NODES

(75) Inventors: Stefan Berndt, Bönen (DE); Bruno Bozionek, Borchen (DE); Thomas Hanna, Detmold (DE); Bernd Hinz, Rheda-Wiedenbrück (DE); Thorsten Laux, Paderborn (DE); Ralf Neuhaus, Lünen (DE); Christian Scheering, Bielefeld (DE); Rainer Uecker, Mülheim (DE); Rainer Zimmermann, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 1055 days.

(21) Appl. No.: 10/860,566

(22) Filed: Jun. 3, 2004

(65) Prior Publication Data

US 2005/0207397 A1 Sep. 22, 2005

(30) Foreign Application Priority Data

Jun. 11, 2003 (EP) .................................. 03013173

(51) Int. Cl.
*H04B 7/00* (2006.01)
(52) U.S. Cl. ........................ 370/217; 370/219; 370/221; 370/225; 370/227; 370/228

(58) Field of Classification Search ................. 370/352, 370/216, 217, 218, 219, 221, 225, 228
See application file for complete search history.

(56) References Cited

U.S. PATENT DOCUMENTS

| 6,108,300 | A | * | 8/2000 | Coile et al. ................. 370/217 |
| 6,374,302 | B1 | | 4/2002 | Galasso et al. |
| 6,865,655 | B1 | * | 3/2005 | Andersen .................... 711/162 |
| 2003/0012178 | A1 | | 1/2003 | Mussman et al. |
| 2003/0035375 | A1 | * | 2/2003 | Freeman .................... 370/238 |
| 2003/0037283 | A1 | * | 2/2003 | Srinivasan et al. ............ 714/11 |
| 2003/0167343 | A1 | * | 9/2003 | Furuno ....................... 709/244 |

FOREIGN PATENT DOCUMENTS

EP  1 056 254 A2  11/2000

\* cited by examiner

*Primary Examiner*—Fan Tsang
*Assistant Examiner*—Akelaw A Teshale (57) ABSTRACT

For alternate operation of a terminal (EG1) at at least two communication nodes (GK1, GK2), the terminal (EG1) is first registered with a first of the communication nodes (GK1). In this case, registration is followed by there being a logical connection between the terminal (EG1) and the first communication node (GK1). The obtainability of the first communication node (GK1) is monitored, and in the event of the first communication node (GK1) being unobtainable a status information item relating to the unobtainability is produced, and the status information item is taken as a basis for setting up a logical connection between the terminal (EG1) and the second communication node (GK2). The terminal (EG1) is then automatically operated at the second communication node (GK2).

18 Claims, 3 Drawing Sheets

METHOD AND COMMUNICATION ARRANGEMENT FOR ALTERNATELY OPERATING A TERMINAL AT AT LEAST TWO COMMUNICATION NODES

CROSS REFERENCE TO RELATED APPLICATIONS

This application claims priority of European application No. 03013173.4 filed Jun. 11, 2003 and which is incorporated by reference herein in its entirety.

FIELD OF INVENTION

The invention relates to a method for alternately operating a terminal at at least two communication nodes and to a communication arrangement for carrying out the method.

BACKGROUND OF INVENTION

Communication networks usually contain a multiplicity of terminals and a plurality of communication nodes. In circuit switched communication arrangements, for example in ISDN systems, each terminal in this arrangement is permanently registered with a respective communication node (switching center) and is thus permanently associated therewith. In this case, this association is provided by the cabling, so that a terminal, for example a telephone or a fax machine, is registered precisely with that switching center to which this terminal also has a physical connection.

The terminals in voice data networks, frequently also referred to as voice-over-IP networks (VoIP=Voice-over-Internet Protocol), are also permanently associated, and registered, with one of the communication nodes in the respective voice data network. By way of example, such voice data networks use the H.323 protocol (ITU-T-H.323) or the SIP protocol (SIP=Session Initiation Protocol) for signaling. In a voice data network—unlike in circuit switched communication networks—it is basically possible for any network component, that is to say any terminal and any communication node, to interchange data (particularly voice data) with any other network component directly. A fixed association among the network components, as provided in the circuit switched communication networks on the basis of the cabling, is neither imperative nor desirable in voice data networks. The terminals in voice data networks are frequently also referred to as "clients", because these terminals differ significantly from circuit switched terminals. Thus, by way of example, they may be in the form of a telephone with a network connection or else in the form of a computer with a piece of communication software installed thereon. The communication nodes in the voice data networks are frequently also referred to as "gatekeepers" (H.323) or "proxies" or "SIP proxies" (SIP protocol), since the function of these communication nodes forms not only the connection initiation between the clients but also the access control for transfer devices to other networks, the "gateways". In the text below, the term "gatekeeper" is used as standard for gatekeeper and (SIP) proxy, in order to simplify matters.

The communication nodes in the voice data networks store configuration data relating to those terminals which are registered with this communication node. These data are, by way of example, information about the authorizations of the respective client or of the user of the respective client, associations with call acceptance groups, the telephone number of the client etc. The communication node (gatekeeper) with which a client is registered is also referred to as the "home node" or "home gatekeeper". If this client is now intended to be operated at a different communication node, then the corresponding terminal (client) is signed off from the home node and is registered with another communication node, also referred to as the "adoptive gatekeeper" if the change is only temporary. If, following registration, the configuration data stored at the home node are transferred to the "adoptive gatekeeper", then the terminal can be operated at the adoptive gatekeeper in the same way as at its home node. If this "move" to the adoptive gatekeeper is not just brief (temporary), but rather permanent, then the adoptive gatekeeper now becomes the new home node for the terminal.

Such moves, like the one described above, by terminals from one communication node to another communication node are often prompted in order to ensure an even utilization level ("load balancing") for the communication nodes in a communication network. Such a move may also be necessary "on an unscheduled basis", for example if a terminal's home node fails or is no longer obtainable on account of a fault in the communication network. In that case, a substitute communication node, that is to say an adoptive gatekeeper, needs to adopt the function of the original home node either temporarily or permanently.

A drawback which has been found with the known communication networks is that the move by terminals from one communication node to another communication node needs to be controlled manually. Although computer aided tools are known for performing the necessary steps, for example transfer of the configuration data from one communication node to another communication node, automatically on the basis of a manual request, the decision regarding which terminal changes to which communication node at what time needs to be made manually and needs to be input into the system manually. In particular, when changing to the terminal in question or to the terminals in question, the network address of the "new" communication node needs to be added manually. Another drawback is that a merely temporary change of communication node, for example as a result of a fault, also requires the final restoration of the original state, that is to say the move by the terminal back to its original home node, to be initiated and performed manually.

SUMMARY OF INVENTION

The object of the invention is to propose a method which can be used to change terminals between two communication nodes with only little or without any manual involvement, and to propose a communication arrangement in which terminals are changed between communication nodes with as little manual involvement as possible.

The object is achieved by the claims.

For the method, the solution provides that the obtainability of the first communication node is monitored, that in the event of the first communication node being unobtainable a status information item relating to the unobtainability is produced, and that the status information item is taken as a basis for setting up a logical connection between the terminal and the second communication node, and the terminal is automatically operated at the second communication node, which has an associated second address. This ensures that, in the event of the terminal's home communication node being unobtainable, this terminal is operational again in the shortest possible time without this requiring manual inputs.

For the communication arrangement, the solution provides that the communication network contains a management server, that the management server stores a copy of the configuration data required, that the communication network contains a monitoring apparatus which monitors the obtainability of the first communication node, that means are provided for transferring the copy of the configuration data required to a second communication node in the event of the first communication node being unobtainable, so that the terminal is operated at the second communication node in the event of the first communication node being unobtainable. The effect achieved by this arrangement is that the terminal can be operated at the second communication node in the same way as it was operated at the first communication node prior to the change of communication node.

The method is advantageously configured by the characterizing features of dependent patent claims 2 to 13. In this case, the advantages described for the method also apply in the appropriate context to the arrangement.

If the communication network used is a voice data network, the terminal used is a voice data terminal and if the communication nodes used are gatekeepers, then there is no need for manual alignment of the cabling in the communication network.

A terminal which has changed from the first communication node to the second communication node can continue to be operated with its full functionality if the first communication node stores configuration data which relate to the terminal and are required in order to operate the terminal, and if the configuration data required for operating the terminal at a second communication node are transferred to the second communication node. If this involves the transmission not only of the necessary configuration data but also of extra terminal specific configuration data, then "added service features" of the terminal in question may also continue to be used.

The configuration data for a terminal are not lost even when the first communication node fails completely if the terminal is used to store a copy of the configuration data, and if registration of the terminal with the second communication node is followed by the copy of the configuration data being transferred from the terminal to the second communication node and being used by the second communication node in order to operate the terminal. When the configuration data are stored in the terminal itself in this way, there is also no need for operation of a central database for configuration data in the communication network. When a central database is omitted, it is also possible to dispense with a (central) management server.

In the event of the first communication node being unobtainable, the terminal can change to a second communication node without inquiring with a further entity and hence without any time delay by virtue of the terminal being used to store the second address and by virtue of the terminal using the stored second address to register with the second communication node in the event of the first communication node being unobtainable.

In a communication network having a large number of communication nodes, the probability of successful registration with an adoptive communication node increases by virtue of the communication network containing further communication nodes having a respective dedicated address, the terminal being used to store a sorted list containing the addresses of the communication nodes, and, in the event of the first communication node being unobtainable, the list of communication nodes being processed, as a result of registration attempts by the terminal, until the terminal has registered with one of the communication nodes. If the various communication nodes are equipped with different powers in this case, then the list is ideally sorted according to the power of the communication nodes such that registration with a very powerful communication node is attempted first of all, and if this second communication node is unobtainable then registration with less powerful communication nodes is attempted, with losses of performance being accepted.

It is sufficient to store a single further address in the terminal as a precaution against error situations if the communication network operates a management server which has an address and stores the second address, with the terminal being used to store the address of this management server, the terminal sending a query message to the management server in the event of the first communication node being unobtainable, the management server transmitting the second address to the terminal in a response message, and with the terminal using the transmitted second address to register with the second communication node. This practice also lowers the administrative involvement in the communication network when communication nodes are added or removed.

It is possible to avoid storing configuration data or a copy thereof in the terminal by virtue of the management server being used to store a copy of the configuration data, and, when the terminal has registered with the second communication node, by virtue of the copy of the configuration data being transferred from the management server to the second communication node and being used by the second communication node in order to operate the terminal.

It is possible to avoid configuring a new communication node address in the terminal when the communication node changes if the communication network operates a management server which is used to store a copy of the configuration data and the first address, with the management server monitoring the obtainability of the first communication node, and with the management server transferring the copy of the configuration data and the stored first address to the second communication node in the event of the first communication node being unobtainable. In this case, the second communication node is assigned the first address, and the second communication node uses the received copy of the configuration data for the terminal to perform the function of the first communication node by assigning the first address. In the case of this practice, the programming of the terminal is not affected by the change of communication node.

If the configuration data are used at the first communication node in a first format and at the second communication node in a second format, and the configuration data transferred to the second communication node are converted from the first format into the second format before transfer, it is possible to use communication nodes of different types to operate the terminal.

A change of communication node without influencing the terminal is particularly simple to implement if the communication nodes used are respective communication assemblies in a communication installation of modular design, if the management server used is a control assembly in the communication installation of modular design, and if, when the communication assemblies have been started up, the configuration data and the respective address are respectively transferred from the control assembly to the respective communication assembly.

The original state of the communication network is automatically restored by virtue of the unobtainability of the first communication node being monitored when the terminal is operated at the second communication node and by virtue of the terminal being signed off from the second communication node and registered with the first communication node again when the first communication node is obtainable again.

A separate monitoring entity in the communication network may be dispensed with if the monitoring is performed by the second communication node or by the terminal itself.

When the obtainability of the first communication node has been restored, a fresh change may be prevented if operation of the terminal at the second communication node involves the first communication node being replaced by the second communication node. Hence, the original first communication node now becomes the second communication node.

BRIEF DESCRIPTION OF THE DRAWINGS

Exemplary embodiments of the inventive method are explained below with reference to the drawings and are used at the same time to explain an exemplary embodiment of the inventive arrangement.

In this case.

DETAILED DESCRIPTION OF INVENTION

Figure 1:
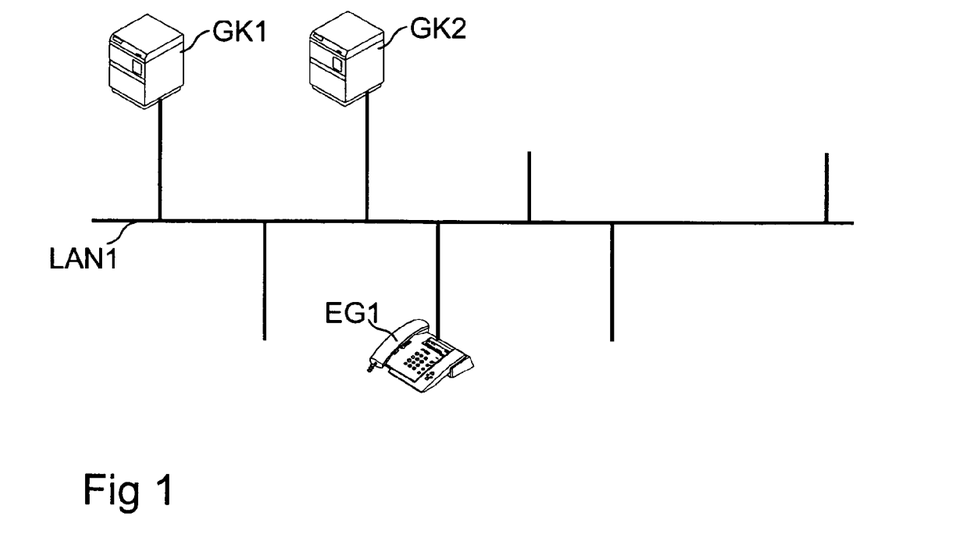
FIG. 1 shows a communication network with a data line, a terminal and two communication nodes.

FIG. 1 shows, as a first exemplary embodiment, a communication network which comprises a data line LAN1, two communication nodes GK1, GK2 and a terminal EG1. The communication network shown also contains other communication nodes and terminals; however, FIG. 1 shows only the network components which are required in order to explain the exemplary embodiment. The communication nodes GK1, GK2 are gatekeepers in a VoIP communication arrangement, and the terminal EG1 is a voice data terminal, that is to say a VoIP client. The communication nodes GK1, GK2 and the terminal EG1 interchange data, particularly voice data, with one another via the data line LAN1. The data line LAN1 is part of a packet switched network in which the data are interchanged on the basis of the Internet protocol. In this case, data are combined into "data packets" which are addressed using the address (IP address) of the respective receiver. For this purpose, the communication node GK1 has an associated first address, the communication node GK2 has an associated second address, and the terminal EG1 has an associated terminal address.

The terminal EG1 is operated at the communication node GK1, that is to say it is registered with the communication node GK1. The communication node GK1 stores configuration data relating to the terminal EG1. These configuration data include, by way of example, details about the authorization of the terminal EG1 to conduct external telephone calls, details about group associations and other information. These configuration data are combined at the communication node GK1 to form a configuration data record, of which a current copy is created at regular intervals of time, this copy respectively being transferred to the terminal EG1. A separate memory area in the terminal EG1 is used to store this copy. If a newly created copy does not differ from the previously created copy which has been transferred, the fresh transfer of the configuration data to the terminal does not occur.

The terminal EG1 likewise stores a list of all of the communication nodes GK1, GK2 in the communication network which are able to be used by the terminal EG1. This list is prioritized, i.e. the communication node GK1, which acts as home node, is recorded at the first position in the list, the communication node GK2, which is provided as the most suitable substitute communication node, is recorded at the second position, and other communication nodes (not shown in FIG. 1) in the communication network are recorded at the other positions in the list.

Among the configuration data, it is possible to distinguish between requisite configuration data and full configuration data. Requisite configuration data are those configuration data which are absolutely necessary in order for a terminal to be able to be operated at a communication node having a basic functionality, that is to say in order to perform a pure telephony function. Full configuration data also comprise those settings and information which are required in order to implement "added service features", for example for configuring call acceptance groups, personal telephone directories etc. In the present exemplary embodiment, the full configuration data are stored as a copy in the terminal EG1.

The terminal EG1 checks at regular intervals of time whether the communication node GK1 is obtainable. To this end, the terminal EG1 is equipped with a monitoring device. If an error occurs at the communication node GK1 or in the connection between the terminal EG1 and the communication node GK1, the terminal EG1 detects the error situation "unobtainable". The terminal EG1 produces a status information item corresponding to the error situation, and the registration function of the terminal EG1 attempts to use this status information item to register with a different communication node in the communication network. To this end, the terminal EG1 calls its stored list of available communication nodes and reads the network address of the prioritized substitute system, namely the communication node GK2, from this list. The terminal EG1 then sends a registration message to the communication node GK2. The communication node GK2 detects that it has sufficient capacity reserves and that the terminal EG2 is authorized to register with the communication node GK2. The communication node GK2 thus sends a confirmation message to the terminal EG1, which, in response, sends the configuration data stored as a copy to the communication node GK2. For the purpose of this transmission of configuration data, the terminal EG1 comprises, as transfer means, a program with communication sub routines in appropriate form. The communication node GK2 uses the received configuration data for the terminal EG1 to configure itself in the same way as the communication node GK1 was configured beforehand.

The communication node GK2, for its part, now checks at regular intervals of time whether the communication node GK1, whose terminal EG1 is being managed by it as a "guest", is operational again and whether the connection to this communication node GK1 exists again. As soon as this is the case, the communication node GK2 takes away the authorization to use the communication node GK2 from the terminal EG1, which corresponds to signing off the terminal EG1 from the communication node GK2. As a result, on the basis of the regular checks to determine whether the communication node GK2 used is obtainable, the terminal EG1 again detects the error situation "unobtainable" and again starts to find a communication node which can be used on the basis of the stored, sorted (prioritized) list. Since the list entry having the highest priority is the entry for the communication node GK1, the terminal EG1 is again registered with the communication node GK1, as a result of which the original state is restored.

Alternatively, the terminal EG1 itself may also check at regular intervals of time whether the communication node GK1 or the connection to this communication node GK1 has been restored, and after the latter has been restored it can sign off from the communication node GK2 used as a substitute and can register with the communication node GK1 again.

As an alternative to the restoration of the original state described above, the components of the communication network may also be programmed such that the terminal EG1 is no longer changed back from the communication node GK2 to the communication node GK1, but rather that the communication node GK2 now represents the home communication node of the terminal EG1, and the original home communication node GK1 now becomes a substitute communication node having a corresponding priority.

The list which is stored in the terminal EG1 can also record such communication nodes as have a lower scope of services than the home communication node GK1. Although these communication nodes are regularly classified with a low priority in the list, such less powerful communication nodes may also be used in the event of communication nodes with higher priority being unobtainable. In these cases, not all configuration data transferred by the terminal may be used to configure the communication node which is used as a substitute, but rather only those which can be implemented by the spectrum of services at the communication node which is now being used.

Figure 2:
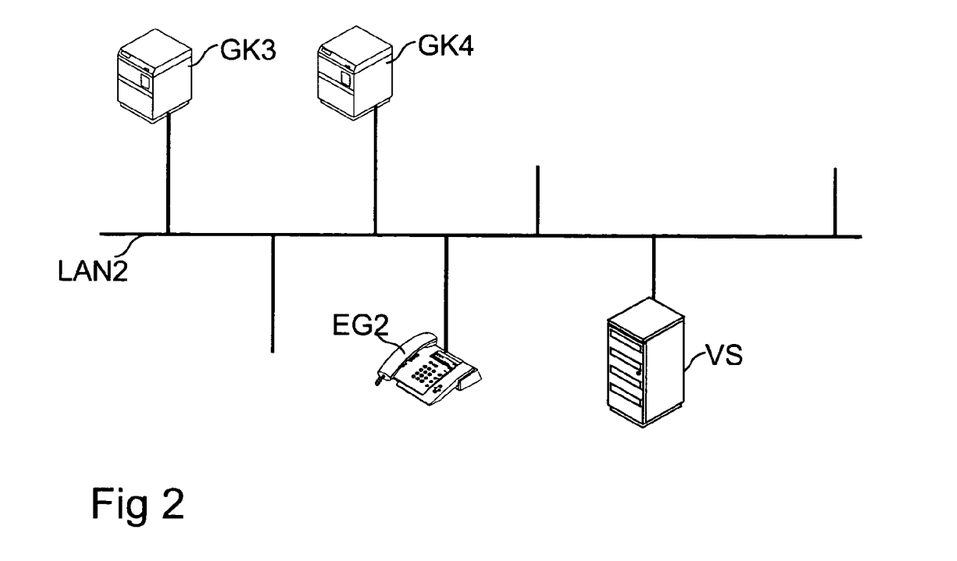
FIG. 2 shows a data network with a data line, a terminal, two communication nodes and a management server.

FIG. 2 shows, as a second exemplary embodiment, a communication network which is similar to the communication network from FIG. 1 and which is likewise equipped with a data line LAN2. The data line LAN2 connects the terminal EG2, the communication nodes GK3, GK4 and the management server VS to one another. In a similar manner to the exemplary embodiment from FIG. 1, the components of the communication network which is shown here each have associated network addresses.

The terminal EG2 is operated at the communication node GK3. The communication node GK4 is intended to be used by the terminal EG2 in those cases in which the communication node GK3 is unobtainable on account of a fault. To this end, the terminal EG2 stores the network address of the management server VS.

The communication node GK4 is arranged as a "passive system" in the communication network. This means that, in the event of there being no faults, the communication node GK4 is not used by any terminal in the communication network, but rather is reserved merely as a substitute system. Besides the active communication node GK3, the communication network may contain a relatively large number of further active communication nodes and also further passive communication nodes; the set of all of the passive communication nodes is also referred to as a "backup pool".

The management server VS arranged in the communication network comprises a database which stores a copy of the configuration data of all of the active communication nodes GK3 in the communication network. To this end, data alignment takes place at regular intervals of time between the active communication nodes and the management server VS.

While the terminal EG2 is registered with its home communication node GK3, the terminal EG2 repeats refreshes its registration with the communication node GK3 at regular intervals of time. This cyclic repetition of registration is also referred to as "lightweight registration" in voice data communication networks based on the H.323 standard. As soon as such a repeat registration operation is not able to take place on account of a fault on the data line LAN2 or at the communication node GK3, the terminal EG2 identifies the error situation "unobtainable", produces a corresponding status information item and sends the latter to the management server VS whose address is stored in the terminal EG2. The management server VS now checks whether the communication node GK3 is actually unobtainable and, if so, determines a substitute communication node, in the present exemplary embodiment the communication node GK4. The management server VS now sends the communication node GK4 the configuration data for the communication node GK3 which are stored in its database. The communication node GK4 uses these configuration data to configure itself in the same way as the communication node GK3 was configured beforehand, and subsequently becomes an active communication node. By sending a test message to the communication node GK4, the management server VS detects that it is ready to operate, and sends the terminal EG2 the network address of the communication node GK4. The terminal EG2 now records the communication node GK4 as its associated home communication node and registers with this communication node GK4.

If the communication node GK4 offers an identical or even improved scope of services as compared with the communication node GK3, then the communication node GK4 continues to be the active communication node even after the obtainability of the communication node GK3 has been restored, while the now restored communication node GK3 becomes a passive, that is to say substitute, communication node. If the communication node GK4 has a smaller scope of services than the communication node GK3, however, then a reduction in functions has arisen when the terminal EG2 has changed from the communication node GK3 to the communication node GK4. In such cases, the management server VS ensures that, when the obtainability of the communication node GK3 has been restored, the configuration data for the communication node GK3 which are stored in the management server VS are again transferred to this restored communication node GK3, and the latter readopts its original function. Alternatively, the management server VS may also transmit these configuration data to a different substitute communication node having a corresponding scope of services in the communication network, in order to ensure that the terminal EG2 is fully functional again.

The management server VS also comprises an alignment unit which is able to convert the format of the configuration data. This is necessary because communication nodes of different types also store the configuration data in different ways. If the configuration data stored as a copy now need to be used with a communication node of another type, the management server VS performs appropriate reconfiguration of the configuration data.

As a result of the transfer of the complete configuration data for the communication node GK3 which has failed to the communication node GK4, all terminals registered with the communication node GK3 are transferred to the substitute communication node GK4, so that even when a large number of terminals are registered the step of transferring configuration data need be performed only once. Hence, if, after the terminal EG3, other terminals (not shown) detect the "loss" of their home communication node GK3 and send a corresponding status information item to the management server VS, then the latter can respond directly using the network address (IP address) of the already configured substitute communication node GK4.

Figure 3:
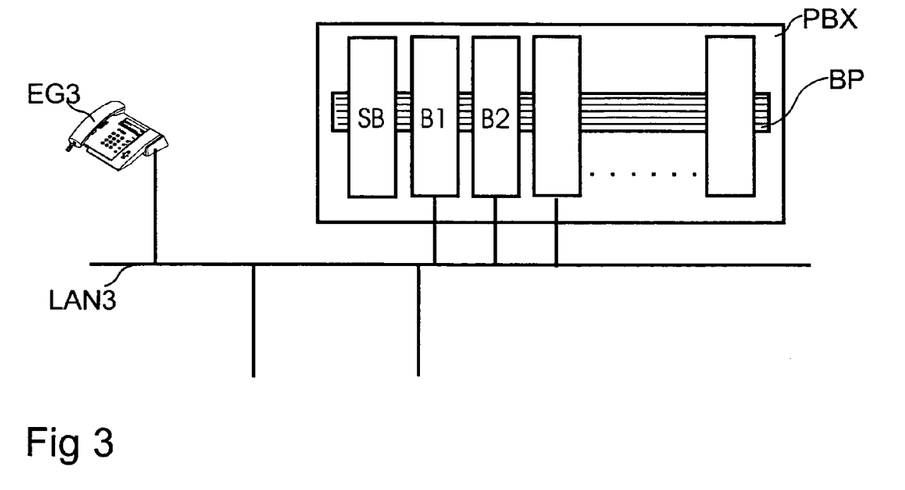
FIG. 3 shows a communication network with a data line, a terminal and a communication installation of modular design which has two communication assemblies and a control assembly.

FIG. 3 shows, as a third exemplary embodiment, a communication network with a data line LAN3 to which the terminal EG3 and the communication installation PBX are connected. The communication installation PBX is a communication installation of modular design in which various assemblies SB, B1, B2 are connected to one another by means of a backplane BP having an electrical data bus. FIG. 3 shows three assemblies SB, B1, B2 in the communication installation PBX, these being the control assembly SB and the communication assemblies B1, B2. The communication assemblies B1, B2 are used as communication nodes for the terminal EG3 and other terminals (not shown here) in the communication network. The communication assemblies B1, B2 are respectively connected to the data line LAN3.

Besides the voice data communication assemblies B1, B2, the communication installation PBX also has other assemblies (not shown here) plugged in for the purpose of connecting circuit switched terminals, and also has assemblies for accessing circuit switched communication networks, that is to say gateway assemblies.

The terminal EG 3 is registered with the communication assembly B1 together with other terminals (not shown here). For the purpose of registration and for ongoing operation, the terminal EG3 stores the network address of the communication assembly B1. The communication assembly B2 is in passive mode and is reserved in the communication installation PBX as a substitute assembly for the active communication assembly B1 and other active communication assemblies (not shown here).

The control assembly SB controls the communication assemblies B1, B2. When one of the communication assemblies B1, B2 is started ("started up"), the necessary operating software is first transferred from the control assembly SB to the respective communication assembly B1, B2. This operating software is used to start the communication assemblies B1, B2. When these have been started, the control assembly transfers to the respective communication assembly B1, B2 the configuration data relating to the terminals which are respectively being managed by the communication assembly B1, B2. Finally, the respective communication assembly B1, B2 is activated by the control assembly SB as a result of the assignment of the respective network address of the communication assembly B1, B2. The procedure just outlined is also referred to as "loading" the assembly.

In the normal, error-free operating state of the communication network shown in FIG. 3, initially only the communication assembly B1 is loaded with operating software, configuration data and a network address. The communication assembly B2 remains passive (inactive) at first. Since the terminal EG3 stores the network address associated with the communication assembly B1, the terminal EG3 can register with this communication assembly B1. When the terminal EG3 registers and is set up, the communication assembly B1 creates and alters configuration data, a copy of which is saved at regular intervals of time in a memory in the control assembly.

The control assembly SB monitors the communication assembly B1 at regular intervals of time and, to this end, regularly requests a status report from this communication assembly B1. The communication assembly B1, in turn, regularly checks whether its connection to the data line LAN3 and to the terminals registered with it, in this case the terminal EG3 under consideration by way of example, exists. The information about whether the link to the data line LAN3 or the connection to the registered terminals exists is transferred from the communication assembly B1 to the control assembly SB upon the requests from the control assembly SB. If the control assembly SB is not able to receive a status report from the communication assembly B1, or a malfunction in the communication assembly B1 or in its connection to the data network is revealed by one of the status reports received, then the control assembly SB identifies that there is an error in this communication assembly B1. If the control assembly now has another connection to the communication assembly B1, it switches the communication assembly B1 to the operating state "inactive". If there is no further connection to the communication assembly B1, then the control assembly assumes that the communication assembly B1 is in an inactive operating state anyway. In both cases, the control assembly produces an internal status information item relating to the unobtainability or malfunction and now loads the communication assembly B2 with operating software and with the configuration data which were originally saved as a copy by the communication assembly B1. Finally, the control assembly SB assigns the communication assembly B2 that network address which was originally used by the communication assembly B1, and thus switches the communication assembly B2 to the active operating state. The terminal EG3 now uses the communication assembly B2 without the need for it to have stored a different network address for the communication assembly which is to be used. In this case, no change to the possible scope of services has arisen.

In communication installations PBX having a relatively large number of active communication assemblies, only one inactive communication assembly needs to be reserved as a substitute assembly, because this substitute communication assembly is able to adopt the functionality of any of the active communication assemblies. In the present exemplary embodiment, all of the communication assemblies B1, B2 are of the same type, which means that it is not necessary to convert the format of the configuration data which are stored as a copy and transferred to the communication assembly B2. If, by contrast, communication assemblies of different types are used, then an alignment program running on the control assembly SB converts the format of the configuration data before the communication assembly B2 is loaded.

Figure 4:
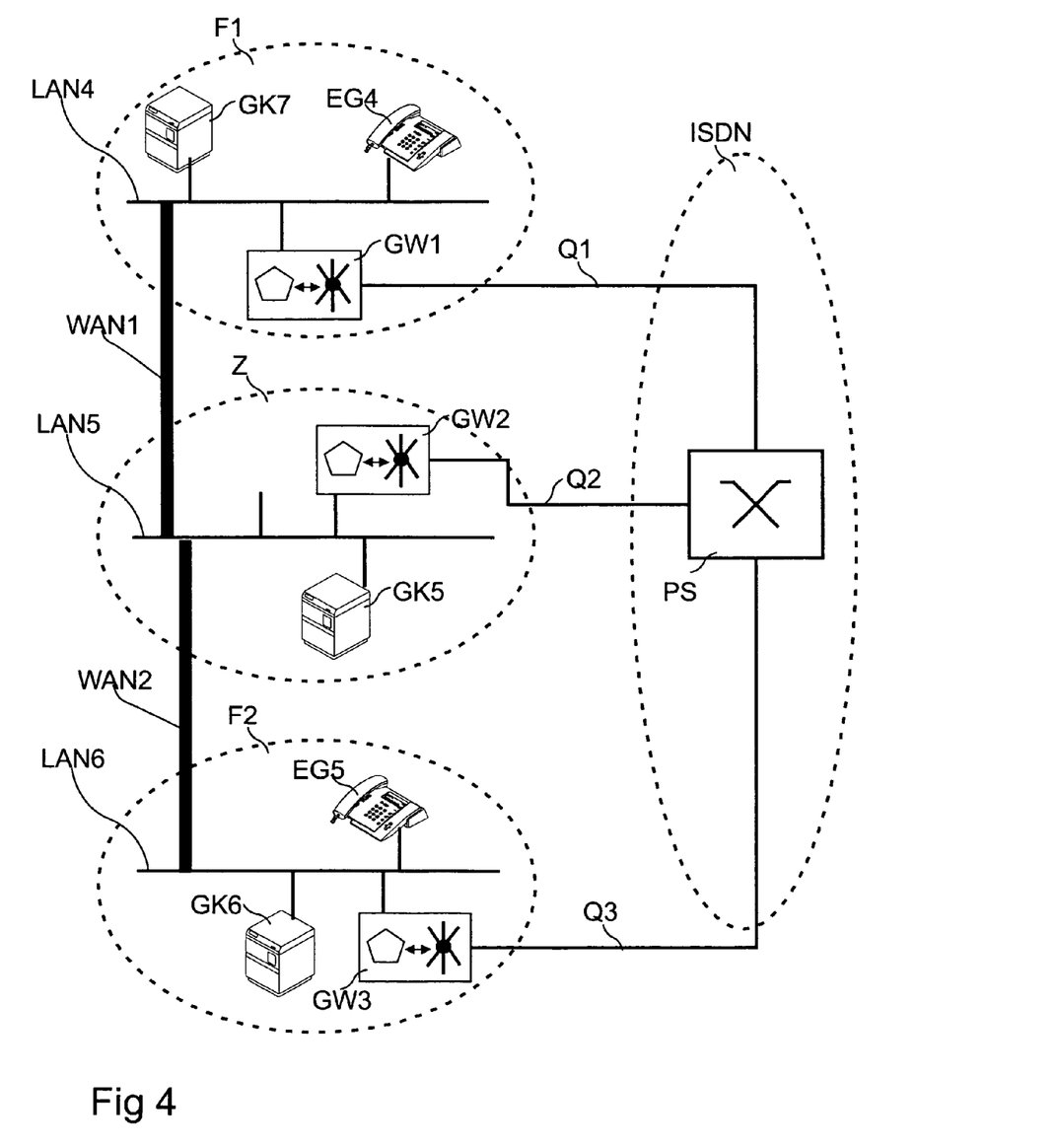
FIG. 4 shows a distributed communication network with a central office, two subsidiaries, a data network, a circuit switched network, two terminals and three communication nodes.

FIG. 4 shows, as a fourth exemplary embodiment, a distributed communication network with a central location Z and two subsidiary locations F1, F2, as is used, by way of example, for banks or insurance companies with a central office and a plurality of subsidiaries.

The subsidiary locations F1, F2 operate the data networks LAN4, LAN6, and the central location Z operates the data network LAN5. In the subsidiary location F1, the data network LAN4 has the terminal EG4, the communication node GK7, which is in the form of a gatekeeper, and the gateway GW1 connected to it. The gateway GW1 connects the subsidiary location F1 to the public circuit switched communication network ISDN. Accordingly, the data network LAN6 at the subsidiary location F2 has the terminal EG5, the communication node GK6 (likewise in the form of a gatekeeper) and the gateway GW3 connected to it, the latter being connected to the communication network ISDN by means of the communication line Q3. Finally, the central location Z is equipped with the data network LAN5, the data network LAN5 having the communication node GK5 and the gateway GW2 connected to it, with the gateway GW2 being connected to the public communication network ISDN by means of the communication line Q2. The data networks LAN4 and LAN5 are connected to one another by means of the wide area data line WAN1, and the data network LAN6 is connected to the data network LAN5 by means of the wide area data line WAN2. The public communication network has at least one network node PS ("public switch"), to which the communication lines Q1, Q2, Q3 and external subscriber lines (not shown here) can be linked.

The gateways GW1, GW2, GW3 respectively represent the link from the respective data network LAN4, LAN5, LAN6 to the public communication network ISDN. These gateways GW1, GW2, GW3 are controlled by the respective communication node (gatekeeper) GK7, GK5, GK6 in the respective data network LAN4, LAN5, LAN6. In the normal (fault free) operating situation in the communication network shown, all of the communication connections between the locations F1, F2, Z are handled using the wide area data line WAN1 and WAN2. Connections to external subscribers, that is to say to subscribers who use the public communication network ISDN are routed exclusively via the communication line Q2 and the gateway GW2.

The terminals EG4, EG5 are registered with the communication node GK5, which also stores the configuration data associated with these terminals EG4, EG5. Hence, if the terminal EG4 or the terminal EG5 communicates with an external subscriber, this telephone connection is then routed, in the case of the terminal EG4, via the data network LAN4, then via the wide area data line WAN1, then via the data network LAN5 and finally via the gateway GW2 and the communication line Q2 to the subscriber in the communication network ISDN. Similarly, calls between the terminal EG5 and an external subscriber are routed using the data network LAN6, the wide area data line WAN2, via the data network LAN5, the gateway GW2, the communication line Q2 and finally via the call processing facilities—not shown here—in the public communication network ISDN.

At the subsidiary location F1, the gateway GW1 and the communication node GK7 used to control the gateway GW1 are thus used neither for external connections nor for the connections to the central location Z. Similarly, at the subsidiary location F2 too, the network components gateway GW3 and communication node GK6 are not used during fault-free operation of the network. The configuration data associated with the terminals EG4, EG5 are, as already mentioned, stored at the communication node GK5. A copy of the configuration data relating to the terminal EG4 is stored at the communication node GK7. The communication node GK7 is thus preprogrammed such that the terminal EG4 can be operated at the communication node GK7 instead of at the communication node GK5 by way of substitution. If, as in the present exemplary embodiment, the communication node GK7 as an emergency system has a lower power and is equipped with a smaller scope of services than the communication node GK5, then its configuration for the terminal EG4 is naturally restricted. By way of example, the communication node GK7 does not allow configuration of any call acceptance groups, which combine subscribers from the entire network comprising the locations F1, F2, Z.

To register with the communication node GK5 and to use this communication node GK5, the terminal EG4 stores the network address of the communication node GK5. As a second network address for the fault situation, the terminal EG4 additionally stores the network address of the communication node GK7. A monitoring function installed in the terminal EG4 checks at regular intervals of time whether the communication node GK5 is obtainable. If this obtainability no longer exists, for example on account of failure of the wide area data line WAN1 or on account of failure of the communication node GK5, the terminal EG4 produces a corresponding status information item and registers with the communication node GK7. The communication node GK7 is programmed such that all of the connections from the terminal EG4 which, up until now, have been routed via the wide area data line WAN1 and the communication node GK5, are now routed via the public communication network ISDN using the gateway GW1 and the communication line Q1. Hence, despite the communication node GK5 being unobtainable, the terminal EG4 can continue to be used. Similarly, the terminal EG5 is also programmed to use the communication node GK6 and the gateway GW3 instead of the wide area data line WAN3 and the central communication node GK5 by way of substitution.

The communication node GK7 now used by way of substitution checks at regular intervals of time whether the communication node GK5 is obtainable again. As soon as this is the case, the communication node GK7 takes away the authorization to use it from the terminal EG4. As a result, the terminal EG4 starts a fresh registration attempt, again in the order that first of all registration with the communication node GK5 and only then a registration attempt with the communication node GK7 are started. Since the communication node GK5 is obtainable again however, the first registration attempt will be successful, which means that the original configuration of the communication network is restored.

Alternatively, the terminal EG4 itself may also check at regular intervals of time whether the communication node GK5 is obtainable again, and—if so—can sign off from the communication node GK7 which is being used and can register with the communication node GK5 again.

Incoming communication connections (calls) for the terminal EG4 from a subscriber in the public communication network ISDN are routed from the public network node PS via the communication line Q1 to the gateway GW1. The gateway GW "translates" the call, under the control of the communication node GK7 as gatekeeper, into the data network LAN4. The call is routed via the wide area data line WAN1 to the data network LAN5 and hence into the "responsibility" of the communication node GK5. The terminal EG4 is registered with the communication node GK5, which means that the call is now signaled on this terminal EG4, again via the data networks LAN5, LAN4 and the wide area data line WAN1. In the error situation, that is to say when the wide area data line WAN1 has failed, for example, not only does the terminal EG4 register with the communication node GK7, but also the communication node GK7 and hence the gateway GW1 are changed over such that incoming communication connections are signaled to the terminal EG4 directly from the communication node GK7.

The invention claimed is:

1. A method for operating a terminal at a plurality of communication nodes, wherein the communication nodes and the terminal are arranged in a communication network, the method comprising:

registering between the terminal and a first communication node by a first address to operate the terminal at the first communication node;

establishing a logical connection between the terminal and the first communication node after the registration;

storing the first address in the terminal for the purpose of registration;

monitoring the accessibility of the first communication node;

creating a status information item relating to the accessibility if the first communication node is inaccessible;

setting up a logical connection between the terminal and a second communication node;

operating the terminal at the second communication node;

wherein the second communication node is selected from one of the plurality of nodes in the communication network, each of the plurality of communication nodes having a respective address;

storing in the terminal a list having the addresses of the plurality of communication nodes;

processing the list to establish a relative ranking for the plurality of communication nodes based on a respective level of communication services provided by each respective one of the plurality of nodes in the communication network, wherein the setting up of the logical connection between the terminal and the second communication is based on the established relative ranking for the plurality of communication nodes.

2. The method as claimed in claim 1, wherein
the communication network is a voice data network, wherein
the terminal is a voice data terminal, and wherein
the communication nodes are gatekeepers.

3. The method as claimed in claim 1, wherein
the first communication node stores configuration data which relate to the terminal and are required for operation of the terminal, and wherein
the configuration data required for operation of the terminal at the second communication node are transferred to the second communication node.

4. The method as claimed in claim 2, wherein
the first communication node stores configuration data which relate to the terminal and are required for operation of the terminal, and wherein
the configuration data required for operation of the terminal at the second communication node are transferred to the second communication node.

5. The method as claimed in claim 3, wherein
the terminal is used to store a copy of the configuration data, and wherein
after the registration of the terminal with the second communication node, the copy of the configuration data is transferred from the terminal to the second communication node and is used by the second communication node in order to operate the terminal.

6. The method as claimed in claim 1, wherein
the terminal is used to store the second address, and wherein
the terminal uses the stored second address to register with the second communication node in the event of the first communication node being inaccessible.

7. The method as claimed in claim 1, further comprising:
providing a management server in the communication network, the management server has an address and stores the second address;
storing the address of the management server in the terminal;
in the case of the first communication node is inaccessible:
sending a query message from the terminal to the management server;
transmitting the second address from the management server to the terminal; and
registering the terminal with the second communication node by use of the second address.

8. The method as claimed in claim 3, further comprising:
providing a management server in the communication network, the management server has an address and stores the second address;
storing the address of the management server in the terminal;
in the case of the first communication node is inaccessible:
sending a query message from the terminal to the management server;
transmitting the second address from the management server to the terminal; and
registering the terminal with the second communication node by use of the second address.

9. The method as claimed in claim 8, wherein
the management server is used to store a copy of the configuration data, and wherein
after registration of the terminal with the second communication node the copy of the configuration data is transferred from the management server to the second communication node and is used by the second communication node to operate the terminal.

10. The method as claimed in claim 3, wherein
a management server which is used to store a copy of the configuration data and the first address is operated in the communication network, wherein
the management server monitors the accessibility of the first communication node, wherein
the management server transfers the copy of the configuration data and the stored first address to the second communication node in the event of the first communication node being inaccessible, wherein
the second communication node is assigned the first address, and wherein
the second communication node uses the received copy of the configuration data for the terminal and assigns the first address to perform the function of the first communication node.

11. The method as claimed in claim 9, wherein
the configuration data are used at the first communication node in a first format and at the second communication node in a second format, and wherein
the configuration data transferred to the second communication node are converted from the first format into the second format before transfer.

12. The method as claimed in claim 10, wherein
the communication nodes used are a respective communication assembly in a communication installation of modular design, wherein
the management server used is a control assembly in the communication installation of modular design, and wherein
the startup of the communication assemblies is followed by the configuration data and the respective address being respectively transferred from the control assembly to the respective communication assembly.

13. The method as claimed in claim 1, wherein
operating of the terminal at the second communication node involves the inaccessibility of the first communication node being monitored, and wherein
the terminal is signed off from the second communication node and is registered with the first communication node again when the first communication node is accessible again.

14. The method as claimed in claim 13, wherein the monitoring is effected by the second communication node.

15. The method as claimed in claim 1, wherein operation of the terminal at the second communication node involves the first communication node being replaced by the second communication node.

16. A method for alternately operating a terminal at least two communication nodes, wherein the communication nodes and the terminal are arranged in a communication network,
wherein the terminal is operated at a first of the communication nodes having a first address by virtue of registration between the terminal and this first communication node, wherein registration is followed by there being a logical connection between the terminal and the first communication node,
wherein the first address is stored in the terminal for the purpose of registration,
wherein the obtainability of the first communication node is monitored,
wherein in the event of the first communication node being unobtainable a status information item relating to the unobtainability is produced,
wherein the status information item is taken as a basis for setting up a logical connection between the terminal and the second communication node, and wherein the terminal is automatically operated at the second communication node, which has an associated second address,
wherein the second communication node is selected from one from a plurality of communication nodes in the communication network, each of the plurality of communication nodes having a respective address,
wherein a relative ranking is established for the plurality of communication nodes based on a respective level of communication services provided by each respective one of the plurality of nodes in the communication network,
wherein the setting up of the logical connection between the terminal and the second communication is further based on the established relative ranking for the plurality of communication nodes.

17. A communication arrangement, comprising:
a plurality of communication nodes, each of the plurality of communication nodes having a respective address;
a terminal for alternate operation at the communication nodes;
a management server;
a monitoring apparatus for monitoring the accessibility of a first communication node;
a communication network, comprising:
   the management server,
   the monitoring apparatus,
   the terminal and
   the communication nodes, wherein
the terminal is operated at the first communication node having a first address by virtue of the terminal having registered with the first communication node, wherein
the first address is stored in the terminal for the registration, wherein
the first communication node stores configuration data relating to the terminal and required for operation of the terminal and wherein
the management server stores a copy of the configuration data required; and
a mechanism for transferring the copy of the configuration data required to a second communication node if the first communication node is inaccessible so that the terminal is operated at the second communication node, wherein the second communication is selected from the plurality of nodes in the communication network;
a memory configured to store in the terminal a list having the addresses of the plurality of communication nodes;
a processor configured to process the list of the plurality of communication nodes to establish a relative ranking for the plurality of communication nodes based on a respective level of communication services provided by each respective one of the plurality of nodes in the communication network, wherein the selection of the second communication node is based on the established relative ranking for the plurality of communication nodes.

18. The communication arrangement as claimed in claim 17, wherein
the configuration data are stored at the first communication node in a first format and at the second communication node in a second format, and wherein
the management server comprises an alignment unit which converts the configuration data from the first format into the second format before transfer to the second communication node.

\* \* \* \* \*